(12) United States Patent
Zhu et al.

(10) Patent No.: US 8,761,206 B1
(45) Date of Patent: Jun. 24, 2014

(54) UNIVERSAL PACKER

(75) Inventors: Jun Zhu, San Jose, CA (US); Zhihua Chen, Cupertino, CA (US); Yan Zhu, Shanghai (CN)

(73) Assignee: Marvell International Ltd., Hamilton (BM)

( * ) Notice: Subject to any disclaimer, the term of this patent is extended or adjusted under 35 U.S.C. 154(b) by 118 days.

(21) Appl. No.: 13/425,701

(22) Filed: Mar. 21, 2012

Related U.S. Application Data

(60) Provisional application No. 61/467,320, filed on Mar. 24, 2011.

(51) Int. Cl.
*H04J 3/00* (2006.01)
(52) U.S. Cl.
USPC ............................................. 370/476

(58) Field of Classification Search
USPC ............................................. 341/67
See application file for complete search history.

(56) References Cited

U.S. PATENT DOCUMENTS 5,517,584 A * 5/1996 Jennings ........................ 382/276

* cited by examiner

*Primary Examiner* — Chandrahas Patel

(57) ABSTRACT

Data packers having corresponding methods and tangible computer-readable media comprise: a controller configured to receive output information, wherein the output information specifies an output alignment; a first multiplexer configured to pass one of data received into the data packer, and data stored in a register of the data packer; a rotate shifter configured to rotate-shift, in accordance with the output alignment, data passed by the first multiplexer; a second multiplexer configured to pass at least one of the data output by the rotate shifter, and the data stored in the register.

19 Claims, 16 Drawing Sheets

UNIVERSAL PACKER

CROSS-REFERENCE TO RELATED APPLICATIONS

This disclosure claims the benefit of U.S. Provisional Patent Application Ser. No. 61/467,320, filed on Mar. 24, 2011, entitled "UNIVERSAL PACKER," the disclosure thereof incorporated by reference herein in its entirety.

FIELD

The present disclosure relates generally to the field of data transfer. More particularly, the present disclosure relates to flexible data scatter-gather techniques.

BACKGROUND

Flexible data scatter-gather is a common data transfer technique. Scatter-gather is widely used, for example, in modern systems-on-chip (SOC) for processes such as direct memory access (DMA), system data management, and the like.

The term "gather" refers to the process of gathering data from multiple buffers. The gather process is conventionally performed by a device referred to as a "packer," and includes "packing" (that is, aligning and concatenating) the data into a single continuous buffer. The term "scatter" refers to the process of scattering data into multiple buffers. The scatter process is conventionally performed by a device referred to as an "unpacker," and includes "unpacking" (that is, separating a data block into multiple blocks for transfer to multiple buffers).

FIGS. 1 through 4 illustrate a conventional scatter-gather DMA operation for a storage system. In FIG. 1, a conventional packer 102 gathers a single file stored in three input buffers 104A,B,C into a single temporary buffer 104D. Then two conventional unpackers 106A,B transfer the file to two different locations by scattering the data from temporary buffer 104D to five output buffers 104E,F,G,H,I. In particular, unpacker 106A scatters the data from temporary buffer 104D to output buffers 104E,F,G and unpacker 106B scatters the data from temporary buffer 104D to output buffers 104H,I.

FIGS. 2 through 4 show the results of the conventional scatter-gather operation of FIG. 1. In FIGS. 2 through 4, each byte of data is represented by a box. Bytes from different input buffers 104A,B,C are represented by different cross-hatching patterns. Empty boxes represent "don't-care" bytes (that is, bytes that are not relevant to the illustrated operation).

FIG. 2 shows the results of the packing operation of FIG. 1 for buffers 104A,B,C,D. In this example, the data bus is eight bytes wide. The source file is 76 bytes long, and is physically stored as three different source blocks in three different physical locations (input buffers 104A,B,C) with different lengths. For source block 0 (represented by vertical cross-hatching), the start address is 0x0002, and the block size is 33 bytes. For source block 1 (represented by horizontal cross-hatching), the start address is 0x0203, and the block size is 3 bytes. For source block 2 (represented by diagonal cross-hatching), the start address is 0x2005, and the block size is 40 bytes. FIG. 2 shows how the blocks have been concatenated and aligned in temporary buffer 104D by packer 102.

FIG. 3 shows the results of the unpacking operation of FIG. 1 for buffers 104D,E,F,G. Unpacker 106A has transferred the file from temporary buffer 104D to output buffers 104E,F,G (referred to herein as destination 0) as three blocks according to specified block lengths and start addresses. In particular, unpacker 106A has transferred destination 0 block 0 to output buffer 104E with a start address 0x4004 and a block size of 20 bytes, has transferred destination 0 block 1 to output buffer 104F with a start address of 0x3007 and a block size of 37 bytes, and has transferred destination 0 block 2 to output buffer 104G with a start address of 0x3203 and a block size of 19 bytes.

FIG. 4 shows the results of the unpacking operation of FIG. 1 for buffers 104D,H,I. Unpacker 106B has transferred the file from temporary buffer 104D to output buffers 104H,I (referred to herein as destination 1) as two blocks according to specified block lengths and start addresses. In particular, unpacker 106B has transferred destination 1 block 0 to output buffer 104H with a start address 0x8003 and a block size of 55 bytes, and has transferred destination 1 block 1 to output buffer 104I with a start address of 0x9002 and a block size of 21 bytes.

FIG. 5 shows a block diagram of a conventional packer 500 for a 64-bit bus. Packer 500 includes a controller 502, a byte shifter 504, a byte mapper 506, two eight-byte buffers 508A,B, and a multiplexer (Mux) 510. Controller 502 operates according to external input control signals Din_valid, Din_loc, Din_len, and Dout_ready, which are generated by a DMA controller or the like, and generates external output control signals Din_ready and Dout_valid, which are provided to a DMA controller or the like. Byte shifter 504 receives input data Din, and shifts that data according to control signal Byte_shift_ctrl provided by controller 502. Byte mapper 506 maps the bytes of the shifted data to buffers 508 according to control signal Byte_map_ctrl provided by controller 502. Multiplexer 510 passes selected bytes of the data from buffers 508 as output data Dout according to control signal Dout_sel provided by controller 502.

Conventional scatter-gather techniques have several disadvantages. Conventional packers and unpackers have different designs with opposite data flows. Therefore conventional scatter-gather systems must employ both, and must employ a temporary buffer 104 between the packers and unpackers. Conventional packers and unpackers also employ a byte mapper 506, which is generally implemented as a large, slow, multi-level multiplexer. The use of a byte mapper requires an internal buffer 508 that is twice the width of the data bus. And because conventional packers and unpackers operate using a push model, they cannot exert back pressure upon the input, and so require a fixed pipeline implementation.

SUMMARY

In general, in one aspect, an embodiment features a data packer comprising: a controller configured to receive output information, wherein the output information specifies an output alignment; a first multiplexer configured to pass one of data received into the data packer, and data stored in a register of the data packer; a rotate shifter configured to rotate-shift, in accordance with the output alignment, data passed by the first multiplexer; a second multiplexer configured to pass at least one of the data output by the rotate shifter, and the data stored in the register.

Embodiments of the apparatus can include one or more of the following features. In some embodiments, the register is configured to store data output by the rotate shifter. In some embodiments, the data received into the data packer is N bytes long, wherein N is an integer greater than zero; and the register is N bytes wide. In some embodiments, the rotate shifter is further configured to rotate-shift, in accordance with the output alignment, the data passed by the first multiplexer. In some embodiments, the output information specifies a desired output length; and the first multiplexer is further configured to pass data in accordance with the desired output length. Some embodiments comprise an apparatus comprising: the data packer; one or more first buffers configured to provide the data received into the data packer; and one or more second buffers configured to receive data passed by the second multiplexer. Some embodiments comprise one or more memory controllers configured to provide the output information. Some embodiments comprise one or more first buffers; one or more second buffers; a temporary buffer; a first data packer, wherein the first data packer is configured to pack data from the one or more first buffers into the temporary buffer; and a second data packer, wherein the second data packer is configured to unpack data from the temporary buffer into the one or more second buffers. Some embodiments comprise one or more first buffers; one or more second buffers; and a data packer according to claim 1, wherein the first data packer is configured to pack data from the one or more first buffers, and to unpack the data into the one or more second buffers. Some embodiments comprise an integrated circuit comprising the data packer.

In general, in one aspect, an embodiment features a method for a data packer, the method comprising: (a) receiving output information, wherein the output information specifies an output alignment; (b) selecting data, wherein the data includes one of data received into the data packer, and data stored in the data packer; (c) rotate-shifting, in accordance with the output alignment, data resulting from (b); (d) selecting at least one of the data resulting from (c), and the data stored in the data packer.

Embodiments of the method can include one or more of the following features. Some embodiments comprise (e) storing the data resulting from (c). In some embodiments, the output information specifies a desired output length; and selecting data in (b) comprises selecting data in accordance with the desired output length. Some embodiments comprise packing data from the one or more first buffers into a temporary buffer; and unpacking data from the temporary buffer into one or more second buffers. Some embodiments comprise packing data from one or more first buffers; and unpacking the data into one or more second buffers.

In general, in one aspect, an embodiment features tangible computer-readable media embodying instructions executable by a data packer to perform functions comprising: (a) receiving output information, wherein the output information specifies an output alignment; (b) selecting data, wherein the data includes one of data received into the data packer, and data stored in the data packer; (c) rotate-shifting, in accordance with the output alignment, data resulting from (b); (d) selecting at least one of the data resulting from (c), and the data stored in the data packer.

Embodiments of the tangible computer-readable media can include one or more of the following features. In some embodiments, the functions further comprise: (e) storing the data resulting from (c). In some embodiments, the output information specifies a desired output length; and selecting data in (b) comprises selecting data in accordance with the desired output length. In some embodiments, the functions comprise: packing data from the one or more first buffers into a temporary buffer; and unpacking data from the temporary buffer into one or more second buffers. In some embodiments, the functions comprise: packing data from one or more first buffers; and unpacking the data into one or more second buffers.

The details of one or more implementations are set forth in the accompanying drawings and the description below. Other features will be apparent from the description and drawings, and from the claims.

DESCRIPTION OF DRAWINGS

FIGS. 2, 3 and 4 show the results of the conventional scatter-gather operation of FIG. 1.

Figure 1:
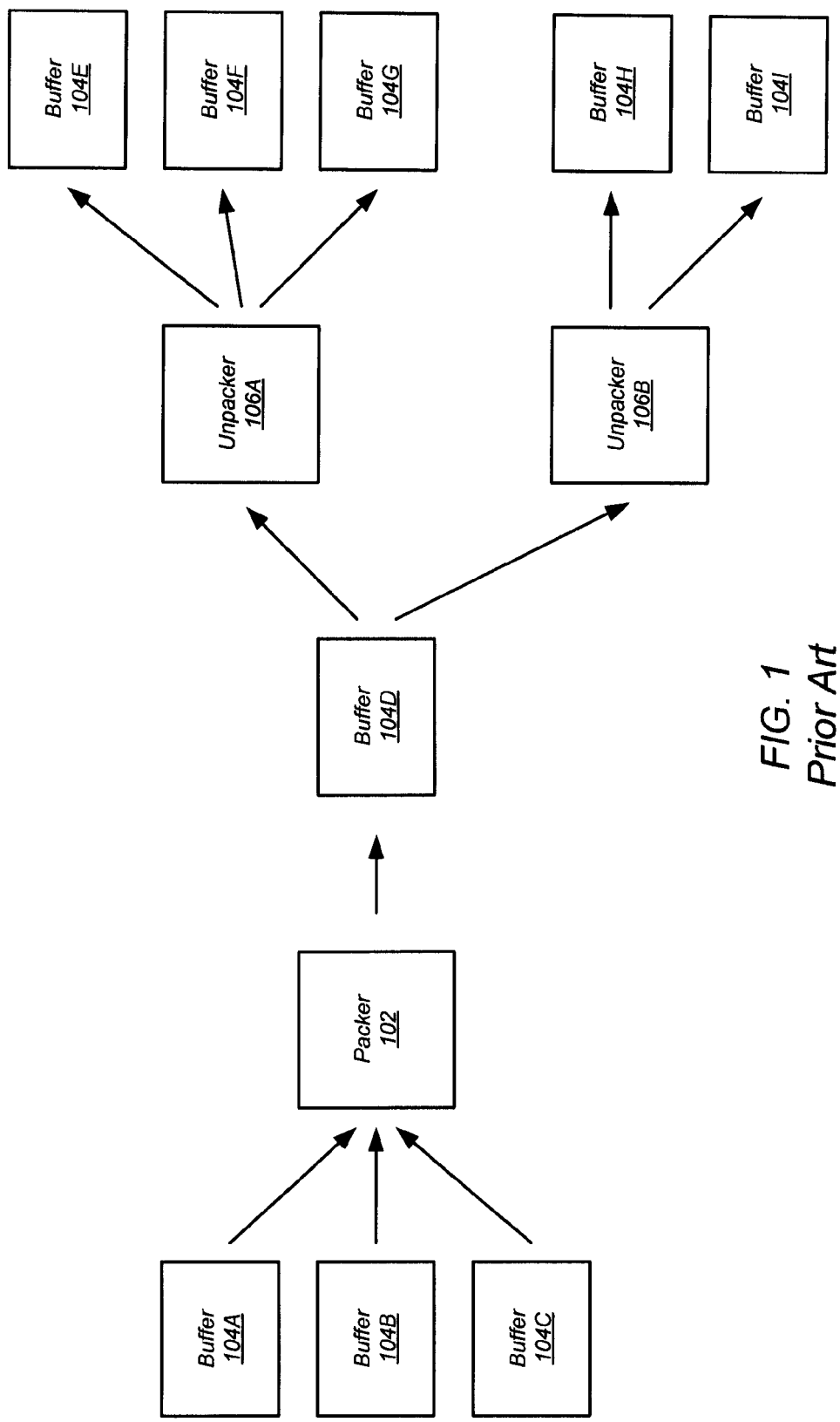
FIGS. 1 through 4 illustrate a conventional scatter-gather DMA operation for a storage system.
Figure 2:
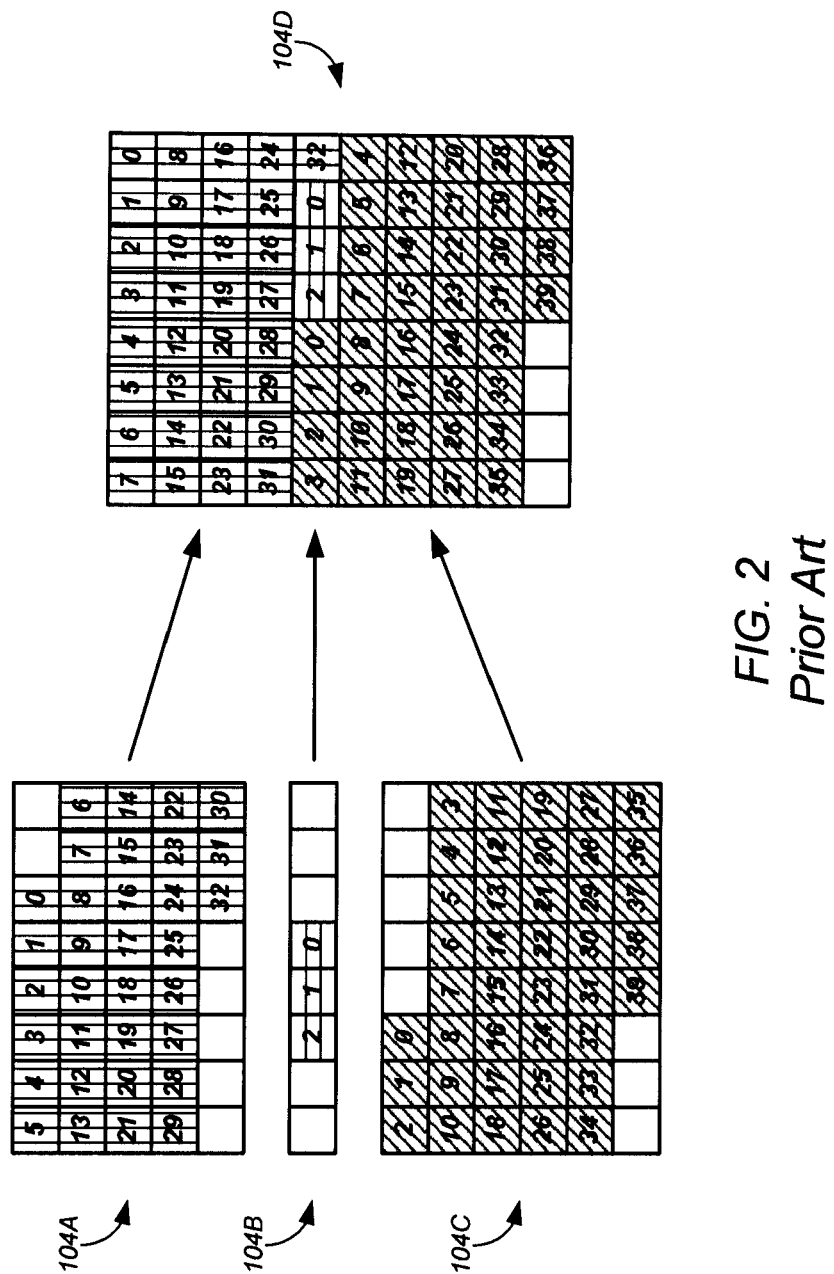
Figure 3:
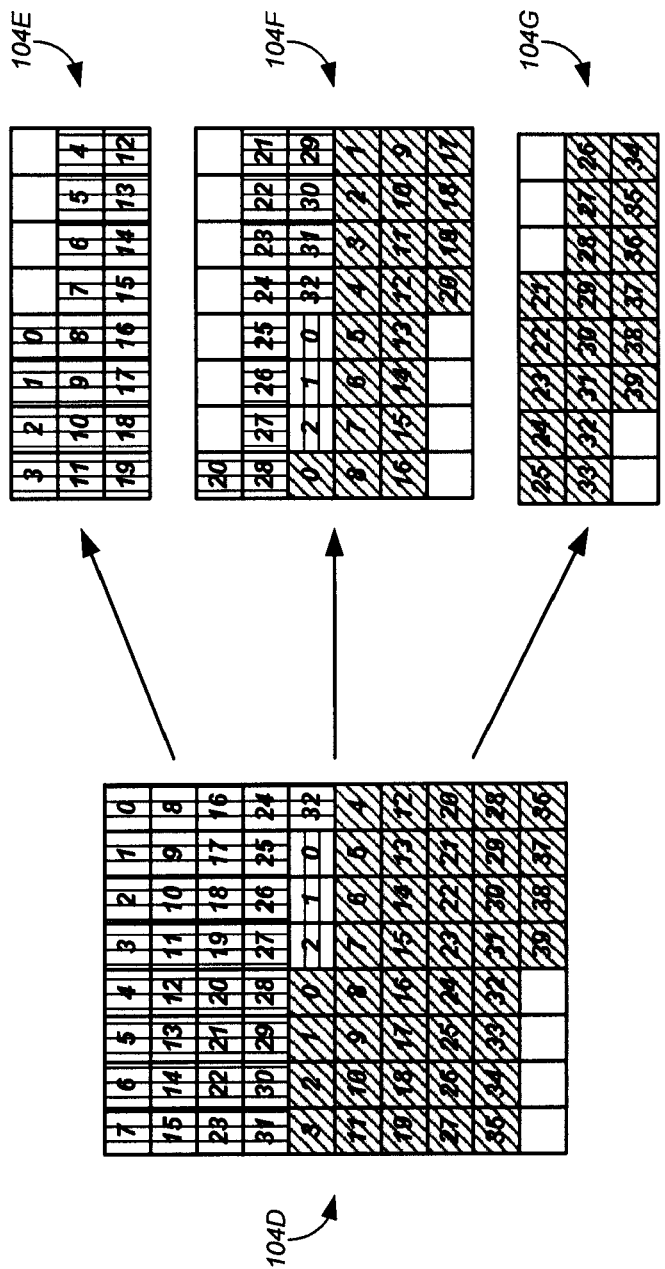
Figure 4:
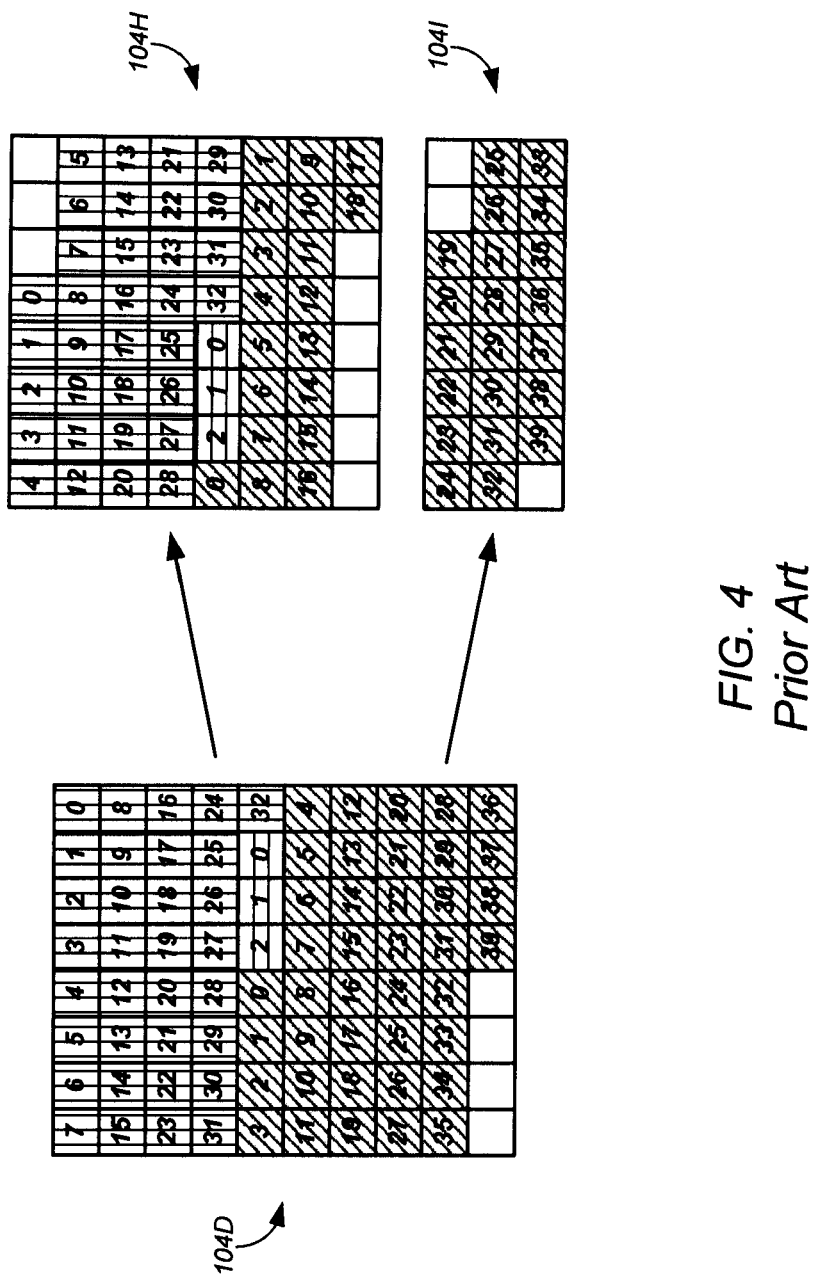
Figure 5:
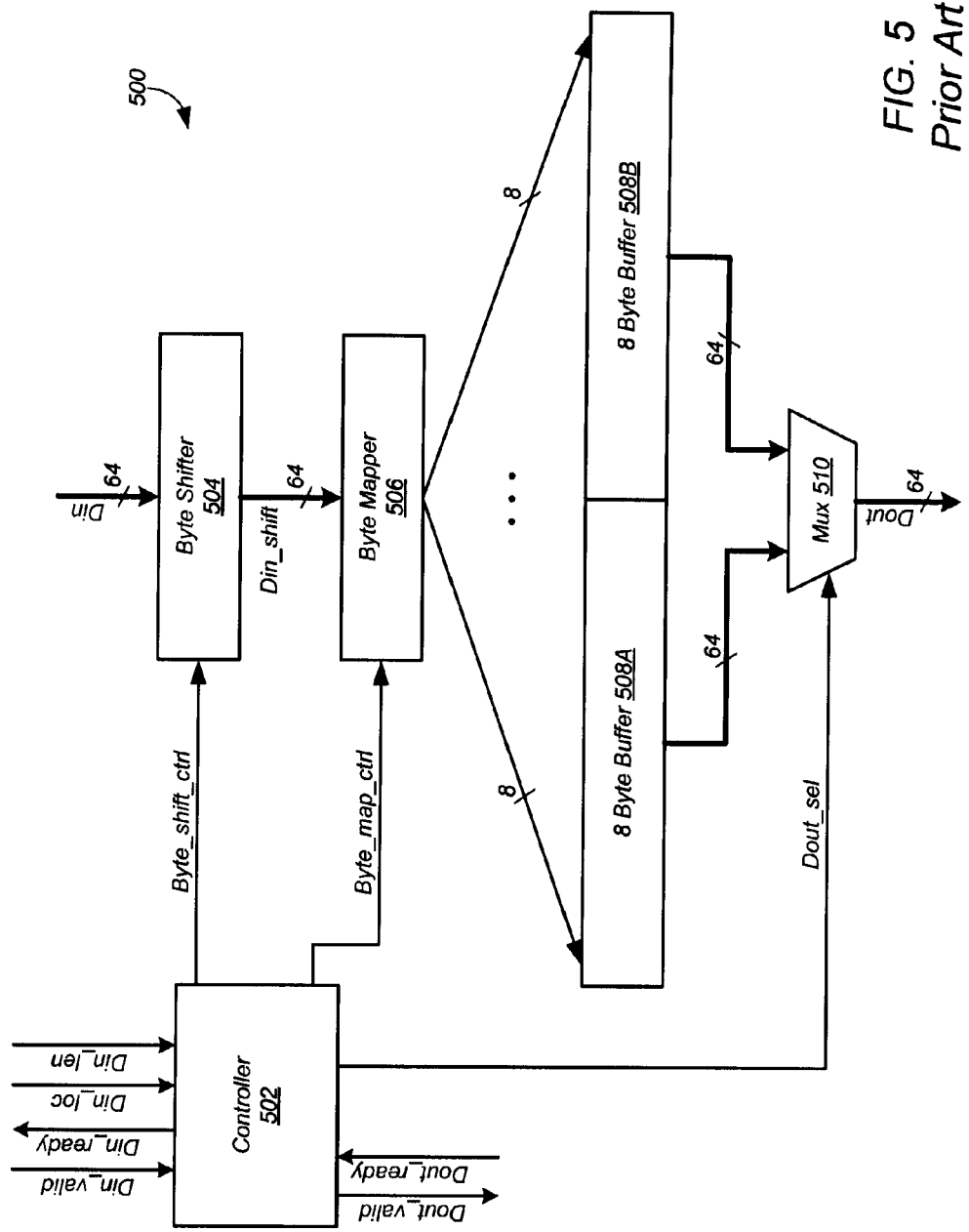
FIG. 5 shows a block diagram of a conventional packer for a 64-bit bus.

The leading digit(s) of each reference numeral used in this specification indicates the number of the drawing in which the reference numeral first appears.

DETAILED DESCRIPTION

Embodiments of the present disclosure provide universal packers that can be used in place of conventional packers and unpackers in scatter-gather data transfer systems. While described in terms of transferring data between memories, the disclosed embodiments can be used to transfer data with other sorts of data channels including data streams and the like. And while described in terms of a 64-bit data bus, the disclosed embodiments are applicable to other data bus widths as well.

Figure 6:
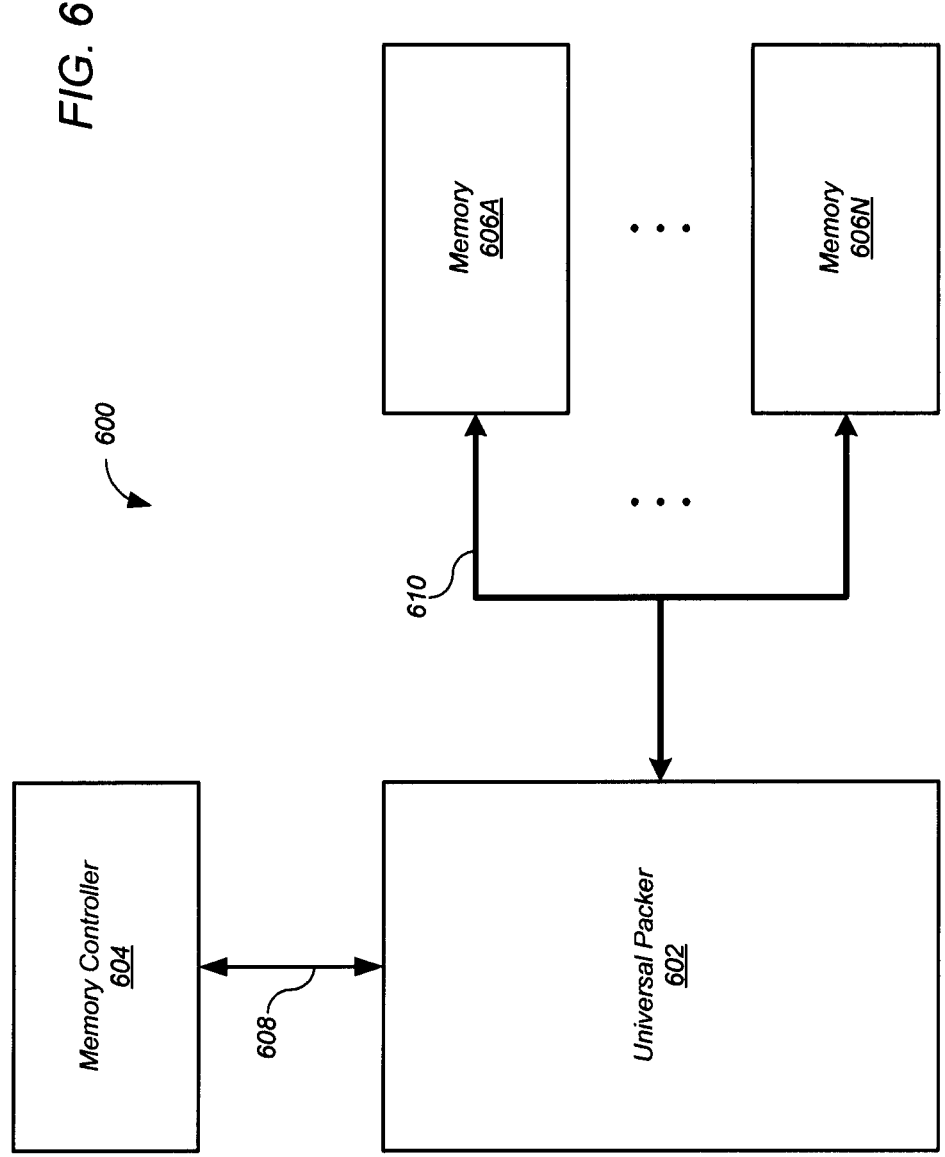
FIG. 6 shows a data storage system that includes a universal packer according to one embodiment.

FIG. 6 shows a data storage system 600 that includes a universal packer 602 according to one embodiment. Data storage system 600 also includes a memory controller 604 and a plurality of memories 606A through 606N. Memory controller 604 can be implemented as one or more DMA controllers or the like. Memories 606 can be implemented in any manner. Embodiments of universal packer 602 are described in detail below.

Universal packer 602 and memory controller 604 exchange control signals 608. In accordance with control signals 608, universal packer 602 transfers data among memories 606 over a data bus 610, as described below.

Figure 7:
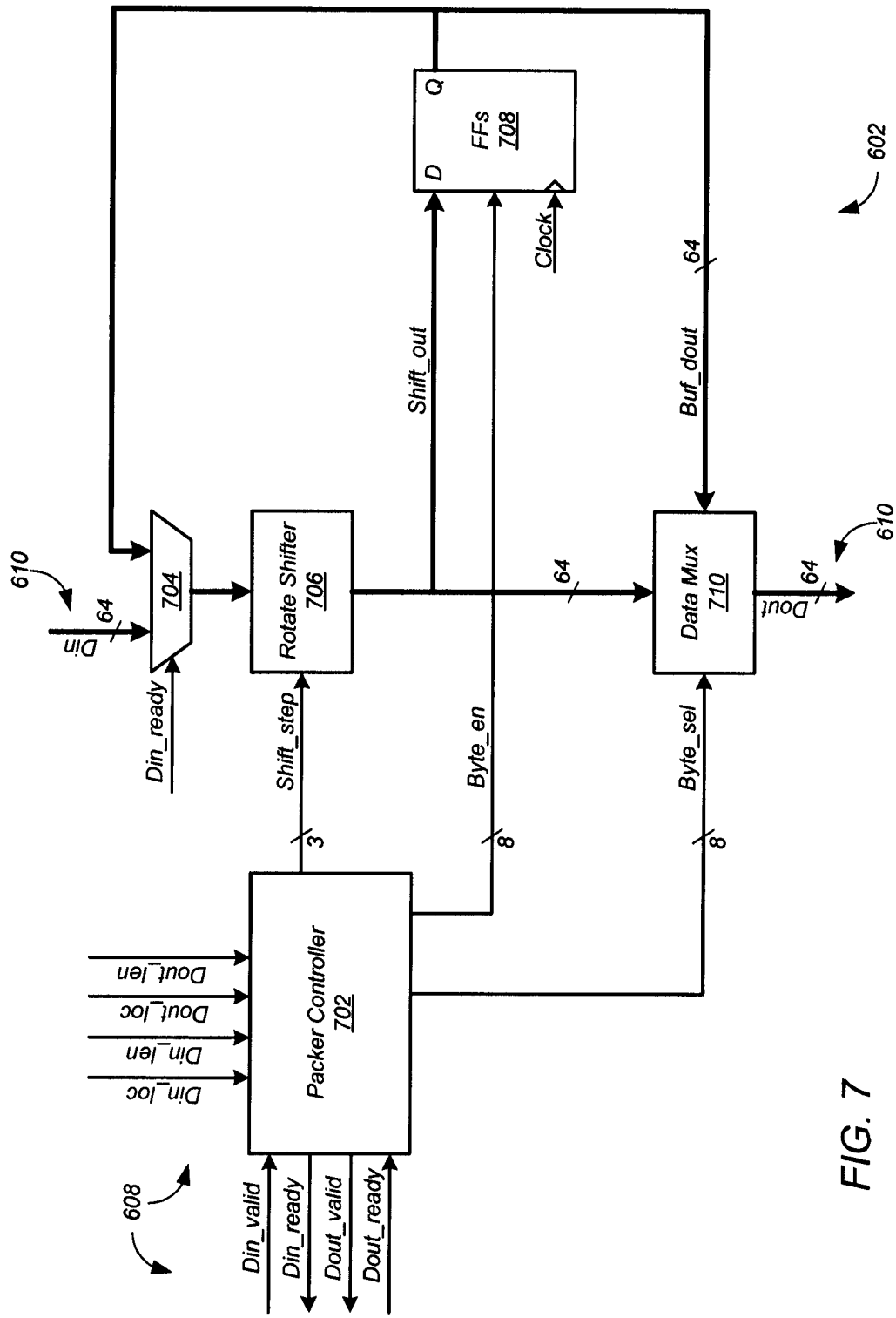
FIG. 7 shows elements of the universal packer of FIG. 6 according to one embodiment.

FIG. 7 shows elements of universal packer 602 of FIG. 6 according to one embodiment. Although in the described embodiments the elements of universal packer 602 are presented in one arrangement, other embodiments may feature other arrangements. For example, elements of universal packer 602 can be implemented in hardware, software, or combinations thereof. In addition, universal packer 602 can be implemented as one or more integrated circuits, as part of a system-on-chip, and the like.

Referring to FIG. 7, universal packer 602 includes a packer controller 702, a multiplexer 704, a rotate shifter 706, DQ flip-flops (FFs) 708, and a data multiplexer 710. Packer controller 702 implements a state machine that operates according to external input control signals Din_valid, Din_loc, Din_len, Dout_loc, Dout_len, and Dout_ready, which are generated by a DMA controller or the like. Packer controller 702 generates external output control signals Din_ready and Dout_valid, which are provided to a DMA controller or the like.

Universal packer 602 and memory controller 604 exchange control signals 608. Packer controller 702 asserts signal Din_ready when universal packer 602 is ready to accept input data Din, and asserts signal Dout_valid when universal packer 602 is ready to output data Dout. Memory controller 604 asserts signal Din_valid when input data Din is ready to push into universal packer 602, and asserts signal Dout_ready when ready to accept output data Dout from universal packer 602.

Memory controller 604 uses signal Din_loc to indicate the start byte location for input data Din (0~7 in this example), and uses signal Din_len to indicate the length of input data Din (1~8 in this example). Memory controller 604 uses signal Dout_loc to indicate the start byte location of output data Dout (0~7 in this example), and uses signal Dout_len to indicate the length of output data Dout (1~8 in this example).

Packer controller 702 controls multiplexer 704, rotate shifter 706, FFs 708, and data multiplexer 710 with internal control signals Din_ready, Shift_step, Byte_en, and Byte_sel. Multiplexer 704 passes either all bytes of input data Din or all bytes of the data stored in FFs 708 in accordance with signal Din_ready.

Figure 8:
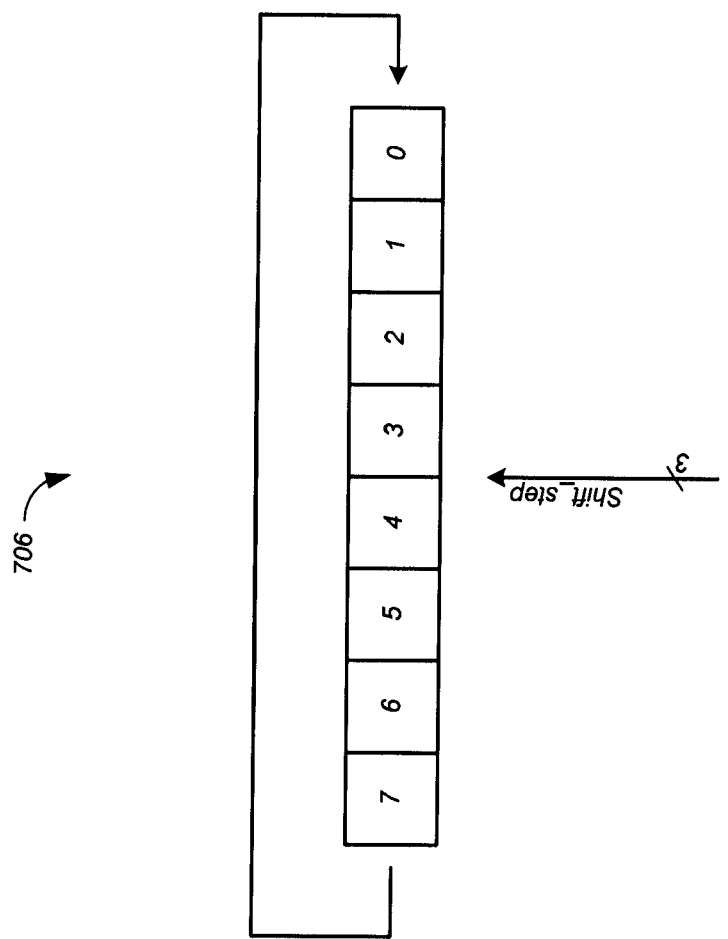
FIG. 8 illustrates the left-shift-rotation operation of the rotate shifter of FIG. 7 for an 8-byte data bus.

Rotate shifter 706 performs a left-shift-rotation upon the data passed by multiplexer 704 with signal Shift_step. FIG. 8 illustrates the left-shift-rotation operation for an 8-byte data bus. Signal Shift_step is a 3-bit signal that specifies the number of bytes by which the data should be shifted and rotated. In other embodiments, rotate shifter 706 performs an equivalent right-shift-rotation instead.

Referring again to FIG. 7, FFs 708 act as a register to store data output by rotate shifter 706 (labeled Shift_out) in accordance with signal Byte_en. Signal Byte_en is an 8-bit signal that indicates which bytes of data Shift_out are to be loaded into FFs 708.

Figure 9:
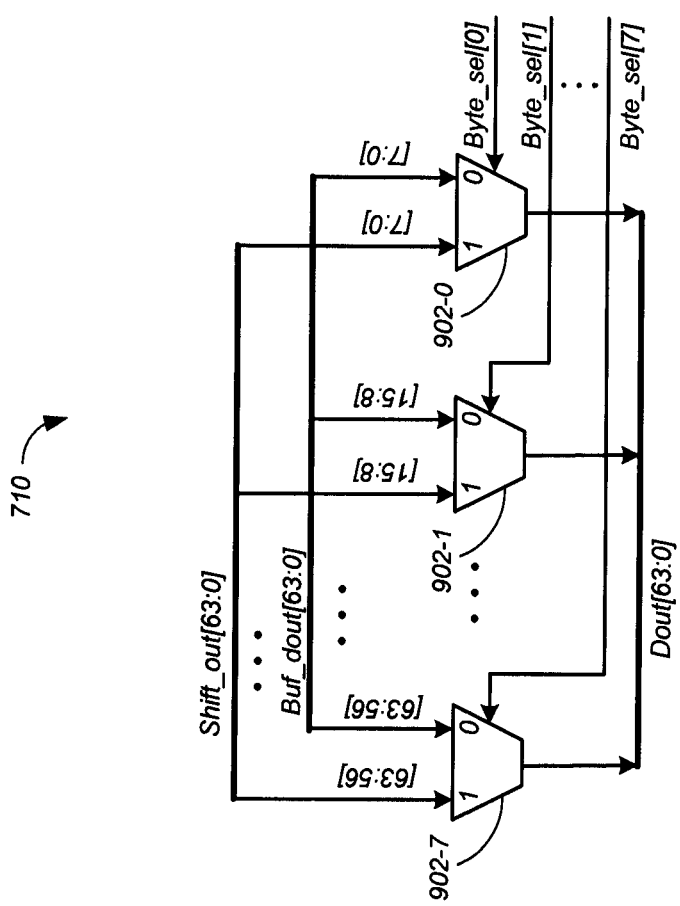
FIG. 9 shows details of the data multiplexer of FIG. 7 for an 8-byte data bus according to one embodiment.

Data multiplexer 710 passes selected bytes of data Shift_out and selected bytes of the data stored in FFs 708 (labeled Buf_dout) as output data Dout in accordance with signal Byte_sel. Signal Byte_sel is an 8-bit signal that indicates which bytes of data Shift_out and/or data Buf_dout are to be passed. FIG. 9 shows details of data multiplexer 710 of FIG. 7 for an 8-byte data bus according to one embodiment. Referring again to FIG. 9, data multiplexer 710 includes eight byte-wise multiplexers 902-0 and 902-1 through 902-7. Each byte-wise multiplexer 902 passes either a byte of data Shift_out or a byte of data Buf_dout according to the respective bit of signal Byte_sel, as shown in FIG. 9. For example, byte-wise multiplexer 902-1 passes either byte [15:8] of data Shift_out or byte [15:8] of data Buf_dout according to signal Byte_sel[1].

Figure 10A:
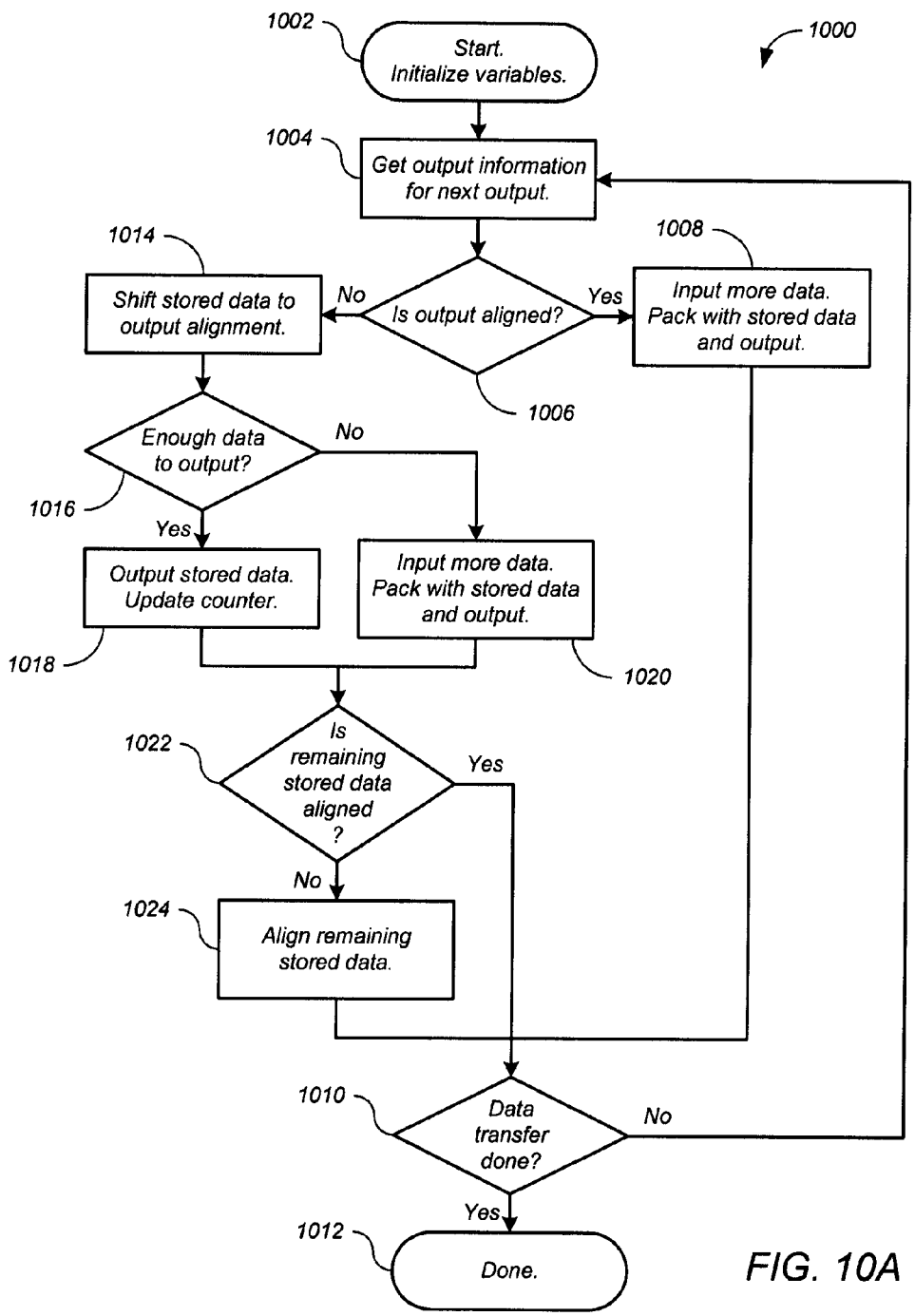
FIGS. 10A,B shows a process for the universal packer of FIG. 7 according to one embodiment.

FIGS. 10A,B shows a process 1000 for universal packer 602 of FIG. 7 according to one embodiment. Although in the described embodiments the elements of process 1000 are presented in one arrangement, other embodiments may feature other arrangements. For example, in various embodiments, some or all of the elements of process 1000 can be executed in a different order, concurrently, and the like. Also some elements of process 1000 may not be performed, and may not be executed immediately after each other.

Referring to FIG. 10A, process 1000 starts at 1002, where variables are initialized. In particular, a variable byte_cnt, which keeps track of the number of bytes of data stored in FFs 708, is set to 0. Packer controller 702 gets output information for the next output Dout at 1004. The output information includes dout_valid, dout_loc, and dout_len. If dout_valid=1, then universal packer 602 can output data, and dout_loc and dout_len are valid. Note that dout_loc+dout_len<=8, where 8 is the data bus width in bytes.

Packer controller 702 determines whether the output is aligned, which occurs only when dout_loc=0 and dout_len=8, at 1006. When the output is aligned at 1006, packer controller 702 inputs more data Din, packs the input data with the data stored in FFs 708, and outputs data Dout, at 1008, as shown in detail in FIG. 10B.

Figure 10B:
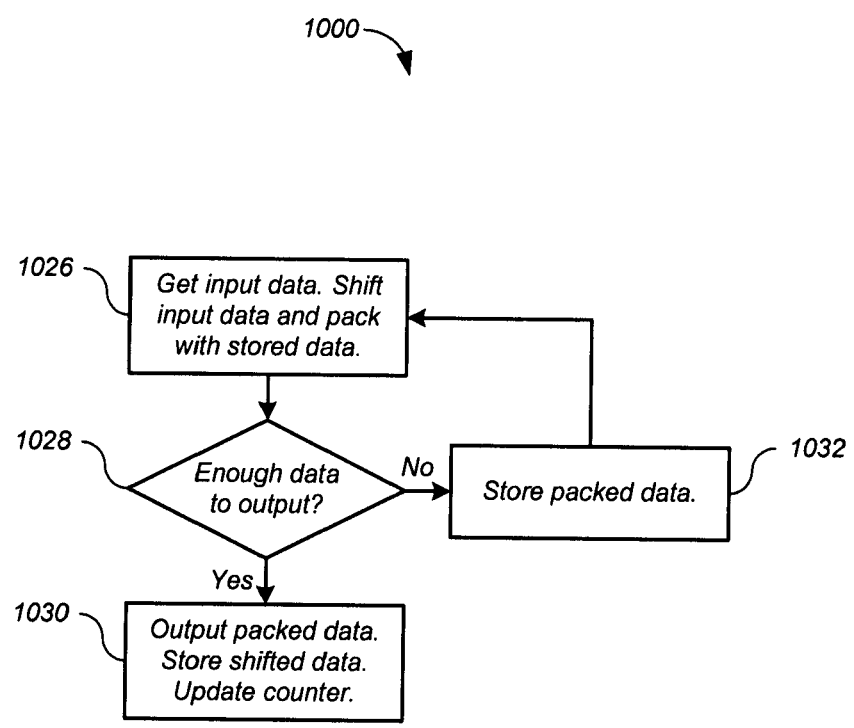

Referring to FIG. 10B, packer controller 702 gets input data, shifts the input data, and packs the shifted input data with the stored data, at 1026. In particular, packer controller 702 inputs data Din, rotate-shifts the input data, and packs the input data with the data stored in FFs 708. When (dout_len+dout_loc)>byte_cnt, there are not enough data in FFs 708 to output, so packer controller 702 sets dout_valid=0, indicating no data output. Packer controller 702 also sets din_ready=1 to get new input data, as well as input information din_len and din_loc. Note that din_len+din_loc<=8, where 8 is the data bus width in bytes. Rotate-shifter 706 then left-rotate-shifts the input data by Shift_step. When byte_cnt>din_loc, Shift_step=byte_cnt−din_loc. Otherwise Shift_step=8+(byte_cnt−din_loc). Packer controller 702 also update byte_cnt according to byte_cnt=byte_cnt+din_len.

Packer controller 702 then determines whether there are enough data to output at 1028. There are enough data to output when dout_len+dout_loc>=byte_cnt. If there are enough data to output at 1028, then packer controller 702 outputs the packed data, and updates the counter, at 1030. In particular, packer controller 702 sets dout_valid=1, and data multiplexer 710 packs (that is, combines) data Buf_dout and Shift_out according to signal Byte_sel to produce output data Dout. Packer controller 702 also updates counter byte_cnt according to byte_cnt=byte_cnt−8. Process 1000 then continues at 1010.

If there are not enough data to output at 1028, then packer controller 702 stores the packed data at 1032. In particular, FFs 708 store the packed data. Packer controller 702 writes only the new input data bytes in Shift_out to FFs 708 by appropriately asserting signal Byte_en. Process 1000 then continues at 1026.

At this point step 1008 is complete. Process 1000 then continues at 1010. Referring again to FIG. 10A, universal packer 602 determines whether the data transfer is done at 1010. If so, then process 1000 is done at 1012. Otherwise process 1000 gets output information for the next output Dout at 1004. Then packer controller 702 determines whether the output is aligned at 1006. When the output is not aligned at 1006, packer controller 702 shifts the data stored in FFs 708 to output alignment at 1014. That is, rotate shifter 706 left-shift-rotates the data stored in FFs 708 so that the least significant byte of the data occupies the byte position indicated by dout_loc. First packer controller 702 sets din_ready=0 to prevent input of new data Din, and sets dout_valid=0 to prevent output of data Dout. Then rotate shifter 706 left-rotate-shifts the data stored in FFs 708 by Shift_step=dout_loc. Packer controller 702 then writes the shifted data shift_out back to FFs 708 with Byte_en=8'hFF. Packer controller 702 then updates byte_cnt according to byte_cnt=byte_cnt+dout_loc.

Packer controller 702 then determines whether there are enough data to output at 1016. There are enough data to output when dout_len+dout_loc<=byte_cnt. If there are enough data to output at 1016, then packer controller 702 outputs the stored data and updates the counter at 1018. In particular, packer controller 702 sets dout_valid=1, and data multiplexer 710 passes data Buf_dout as output data Dout. Packer controller 702 also updates byte_cnt according to byte_cnt=byte_cnt−dout_len. Process 1000 then continues at 1022.

If there are not enough data to output at 1016, then packer controller 702 inputs more data Din, packs the input data with the data stored in FFs 708, and outputs data Dout, at 1020, as shown in detail in FIG. 10B. Process 1000 then moves to 1022.

Packer controller 702 determines whether the data remaining in FFs 708 is aligned at 1022. In particular, packer controller 702 first updates counter byte_cnt according to byte_cnt=byte_cnt−(dout_len+dout_loc). If byte_cnt=0, no data remains in FFs 708. If byte_cnt>0 and (dout_len+dout_loc)=8, the remaining data is aligned, and process 1000 moves to 1010. Otherwise packer controller 702 aligns the data stored in FFs 708 at 1024. In particular, rotate-shifter 706 left-rotate-shifts the data by Shift_step=8−(dout_len+dout_loc), and writes the shifted data back to FFs 708. Process 1000 then moves to 1010.

Figure 11:
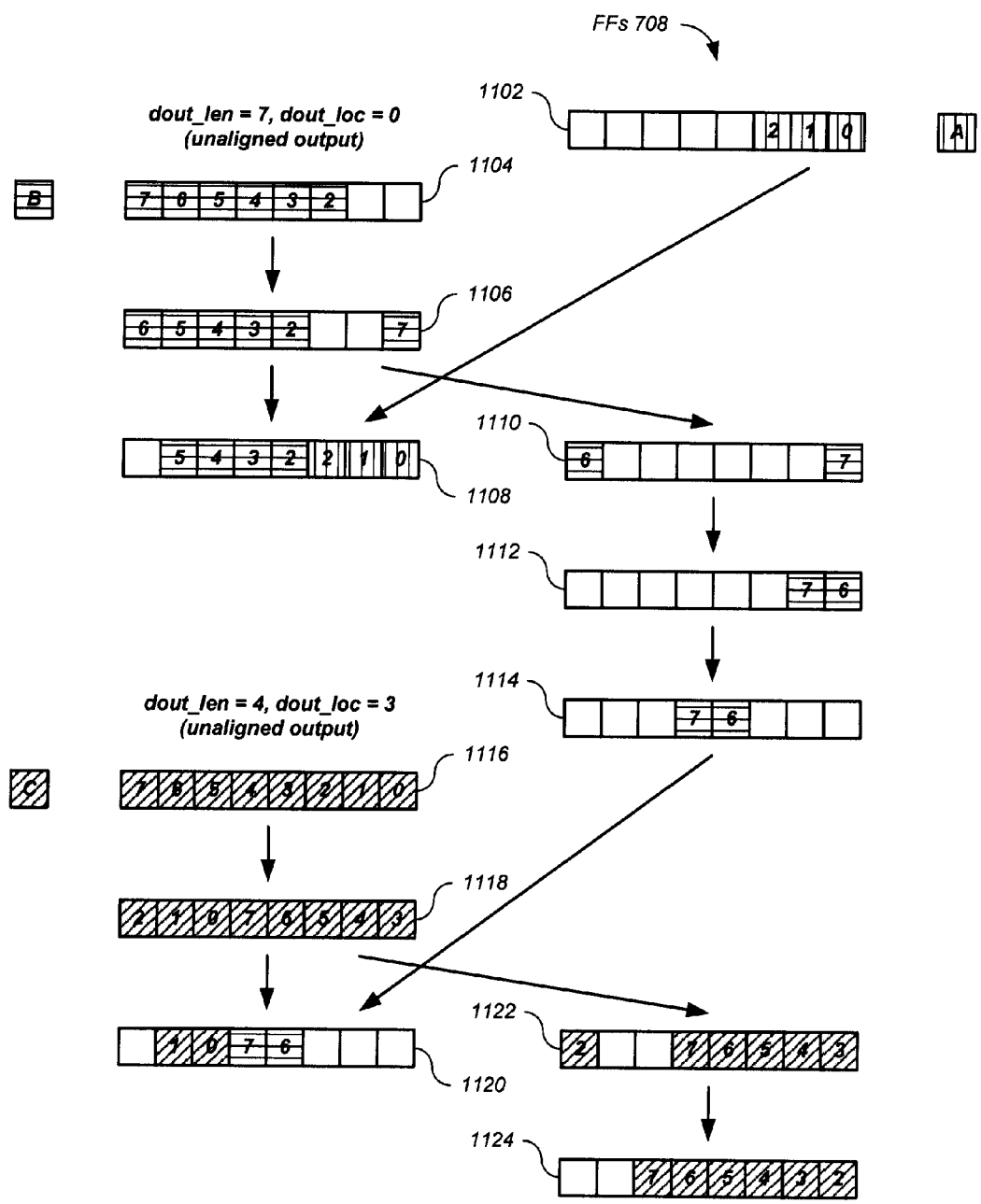
FIG. 11 illustrates an operation of one embodiment of the universal packer of FIG. 7 for two consecutive unaligned outputs.
Figure 12:
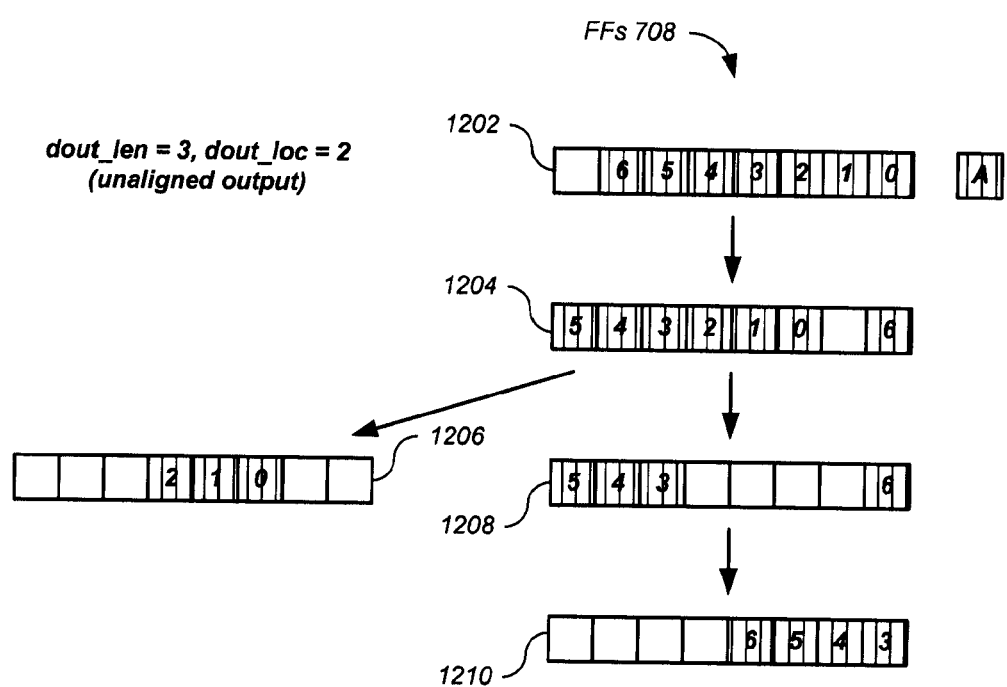
FIG. 12 illustrates an operation of one embodiment of the universal packer of FIG. 7 for one unaligned output.
Figure 13:
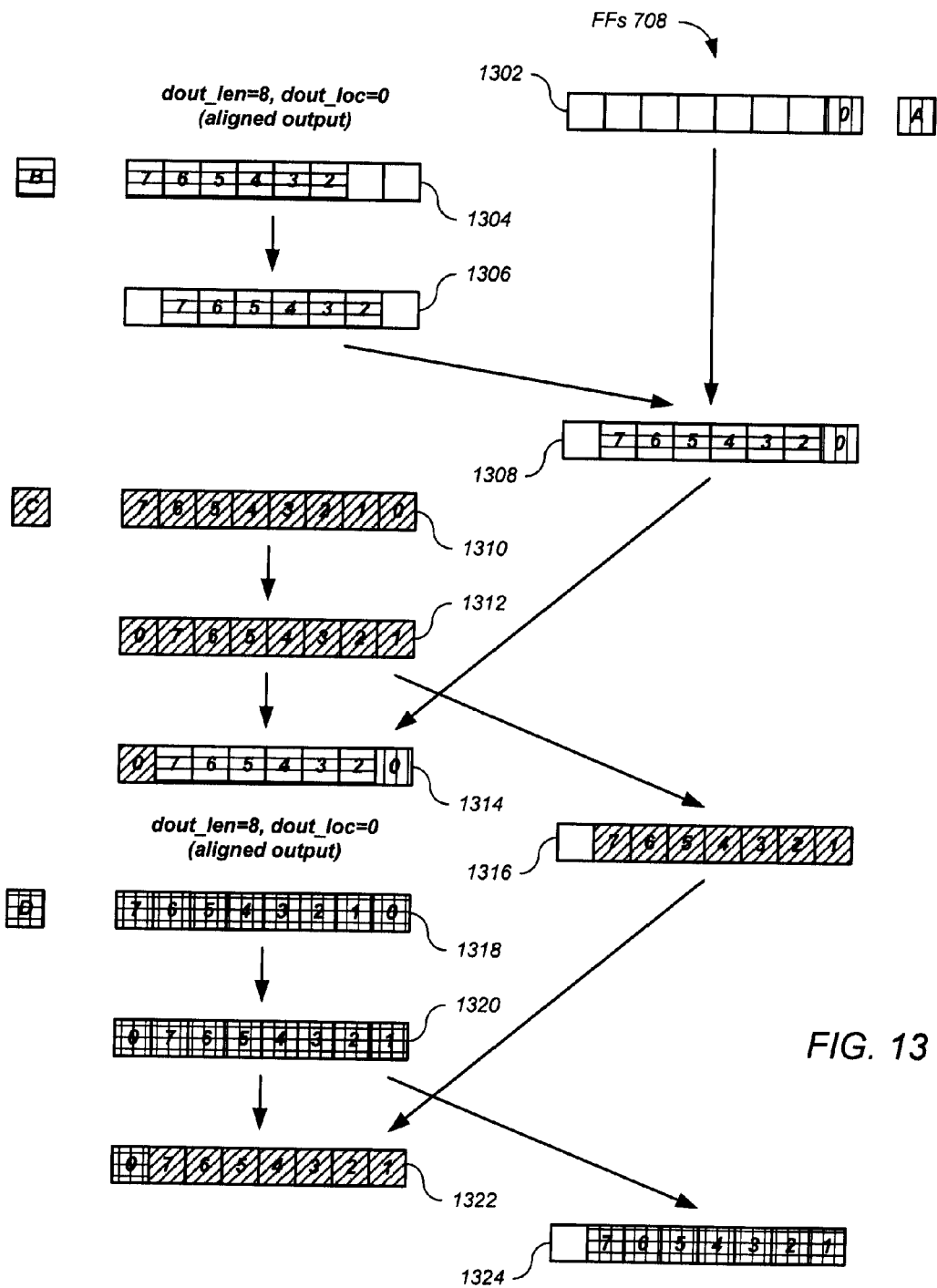
FIG. 13 illustrates an operation of one embodiment of the universal packer of FIG. 7 for an aligned output.

FIGS. 11-13 illustrate operations of one embodiment of universal packer 602 of FIG. 7 for three different output cases. In these examples, each byte of data is represented by a box. Bytes from different inputs Din are represented by different cross-hatching patterns, and are identified in the key in each drawing. Empty boxes represent "don't-care" bytes (that is, bytes that are not relevant to the illustrated operation). In addition, each drawing is arranged in two columns, with the contents of FFs 708 shown in the right-hand column.

FIG. 11 illustrates an operation of one embodiment of universal packer 602 of FIG. 7 for two consecutive unaligned outputs. The example begins as shown at 1102 with data A (indicated by vertical cross-hatching) stored in FFs 708, and with a first output request with dout_len=7 and dout_loc=0. Because dout_len !=8, the output is unaligned. The data in FFs 708 are already at output alignment (dout_loc=0), so do not need to be shifted.

There is no data in FFs 708, so byte_cnt=0. Because dout_len+dout_loc>byte_cnt, there are not enough data to output. Therefore universal packer 602 inputs new data B (indicated by horizontal cross-hatching) as shown at 1104, with din_len=6, and din_loc=2.

Universal packer 602 then left-rotate-shifts data B by Shift_step, as shown at 1106. In this case, byte_cnt>din_loc, so Shift_step=byte_cnt−din_loc=1. Universal packer 602 then packs the data (that is, combines data A with bytes 2-5 of data B) as shown at 1108.

Packer controller 702 updates the internal counter, setting byte_cnt=byte_cnt+din_len=9. Now byte_cnt>dout_loc+dout_len, so there are enough data to output. Therefore universal packer 602 outputs the packed data, shown at 1108, and writes the shifted data (bytes 6 and 7 of data B) to FFs 708 as shown at 1110. Packer controller 702 also sets byte_cnt=byte_cnt−(dout_len+dout_loc)=2.

Because there are data remaining in FFs 708, rotate shifter 706 left-rotate-shifts the data to internal alignment (by 8−(dout_len+dout_loc)=1), and writes the shifted data back to FFs 708 as shown at 1112.

Now packer controller 702 gets output information for the next output (dout_len=4, dout_loc=3). Because dout_len !=8, the output is unaligned. The data in FFs 708 is not at output alignment (dout_loc !=0), so rotate shifter 706 left-rotate-shifts the data in FFs 708 to output alignment (dout_loc=3), and writes the shifted data back to FFs 708, as shown at 1114.

Packer controller 702 also updates the value of byte_cnt according to byte_cnt=byte_cnt+dout_loc=5.

Because dout_len+dout_loc>byte_cnt, there are not enough data to output. Therefore universal packer 602 inputs new data C (indicated by diagonal cross-hatching) as shown at 1116, with din_len=8, and din_loc=0.

Universal packer 602 then left-rotate-shifts data C by Shift_step as shown at 1118. In this case, byte_cnt>din_loc, so Shift_step=byte_cnt−din_loc=5. Universal packer 602 then packs the data (that is, combines bytes 6 and 7 of data A with bytes 0 and 1 of data C) as shown at 1120.

Packer controller 702 updates the internal counter, setting byte_cnt=byte_cnt+din_len=13. Now byte_cnt>dout_loc+dout_len, so there are enough data to output. Therefore universal packer 602 outputs the packed data, shown at 1120, and writes the shifted data (bytes 2-7 of data C) to FFs 708 as shown at 1122. Packer controller 702 also sets byte_cnt=byte_cnt−(dout_len+dout_loc)=5.

Because there are data remaining in FFs 708, rotate shifter 706 left-rotate-shifts the data to internal alignment (by 8−(dout_len+dout_loc)=1), and writes the shifted data back to FFs 708 as shown at 1124.

FIG. 12 illustrates an operation of one embodiment of universal packer 602 of FIG. 7 for one unaligned output. The example begins as shown at 1202 with data A (indicated by vertical cross-hatching) stored in FFs 708, and with a first output request with dout_len=3 and dout_loc=2. Because dout_len !=8, the output is unaligned. Because the data in FFs 708 is not at output alignment (dout_loc=2), rotate shifter 706 left-rotate-shifts the data by dout_loc=2 bytes, and then writes the shifted data back to FFs 708, as shown at 1204. Packer controller 702 updates the internal counter. The number of bytes of data A stored in FFs 708 is byte_cnt=7, so packer controller 702 sets byte_cnt=byte_cnt+dout_loc=9.

Because byte_cnt>dout_loc+dout_len, there are enough data to output. Because dout_len=3, universal packer 602 outputs three bytes (bytes 0-2) of the stored data, as shown at 1206. The remaining bytes of the data (bytes 3-6) remain stored in FFs 708, as shown at 1208. Because there are data remaining in FFs 708, rotate shifter 706 left-rotate-shifts the data to internal alignment (by 8−(dout_len+dout_loc)=3), and writes the shifted data back to FFs 708, as shown at 1210.

FIG. 13 illustrates an operation of one embodiment of universal packer 602 of FIG. 7 for an aligned output. The example begins as shown at 1302 with data A (indicated by vertical cross-hatching) stored in FFs 708, and with a first output request with dout_len=8 and dout_loc=0. Because dout_len=8 and dout_loc=0, the output is aligned. The data in FFs 708 are already at output alignment (dout_loc=0), so does not need to be shifted.

Packer controller 702 updates the internal counter. The number of bytes of data A stored in FFs 708 is byte_cnt=1, so packer controller 702 sets byte_cnt=byte_cnt+dout_loc=1. Because byte_cnt<dout_loc+dout_len, there are not enough data to output. Therefore universal packer 602 inputs new data B (indicated by horizontal cross-hatching) as shown at 1304, with din_len=6, and din_loc=2.

Universal packer 602 then left-rotate-shifts data B by Shift_step, as shown at 1306. In this case, byte_cnt !>din_loc, so Shift_step=8+(byte_cnt−din_loc)=7. Universal packer 602 then packs the data (that is, combines data A with data B) as shown at 1308.

Packer controller 702 updates the internal counter, setting byte_cnt=byte_cnt+din_len=7. Now byte_cnt<dout_loc+dout_len, so there are not enough data to output. Therefore universal packer 602 inputs new data C (indicated by diagonal cross-hatching) as shown at 1310, with din_len=8, and din_loc=0.

Universal packer 602 then left-rotate-shifts data C by Shift_step, as shown at 1312. In this case, byte_cnt>din_loc, so Shift_step=byte_cnt−din_loc=7. Universal packer 602 then packs the data (that is, combines data C with data A and data B stored in FFs 708) as shown at 1314.

Packer controller 702 updates the internal counter, setting byte_cnt=byte_cnt+din_len=15. Now byte_cnt>dout_loc+dout_len, so there are enough data to output. Therefore universal packer 602 outputs the packed data, shown at 1314, and writes the shifted data (bytes 1-7 of data C) to FFs 708 as shown at 1316. Packer controller 702 sets byte_cnt=byte_cnt−(dout_len+dout_loc)=7. The data remaining in FFs 708 are already at internal alignment, and so do not need to be shifted.

Now packer controller 702 gets output information for the next output (dout_len=8 and dout_loc=0). Because dout_len=8 and dout_loc=0, the output is aligned. The data in FFs 708 are already at output alignment (dout_loc=0), so do not need to be shifted. Universal packer 602 inputs new data D (indicated by horizontal and vertical cross-hatching) as shown at 1318, with din_len=8, and din_loc=0.

Universal packer 602 then left-rotate-shifts data D by Shift_step, as shown at 1320. In this case, byte_cnt>din_loc, so Shift_step=byte_cnt−din_loc=7. Universal packer 602 then packs the data (that is, combines byte 0 of data D with data C stored in FFs 708) as shown at 1322.

Packer controller 702 updates the internal counter, setting byte_cnt=byte_cnt+din_len=15. Now byte_cnt>dout_loc+dout_len, so there are enough data to output. Therefore universal packer 602 outputs the packed data, shown at 1322, and writes the shifted data (bytes 1-7 of data D) to FFs 708 as shown at 1324. Packer controller 702 also sets byte_cnt=byte_cnt−(dout_len+dout_loc)=7. The data remaining in FFs 708 are already at internal alignment, and so do not need to be shifted.

Figure 14:
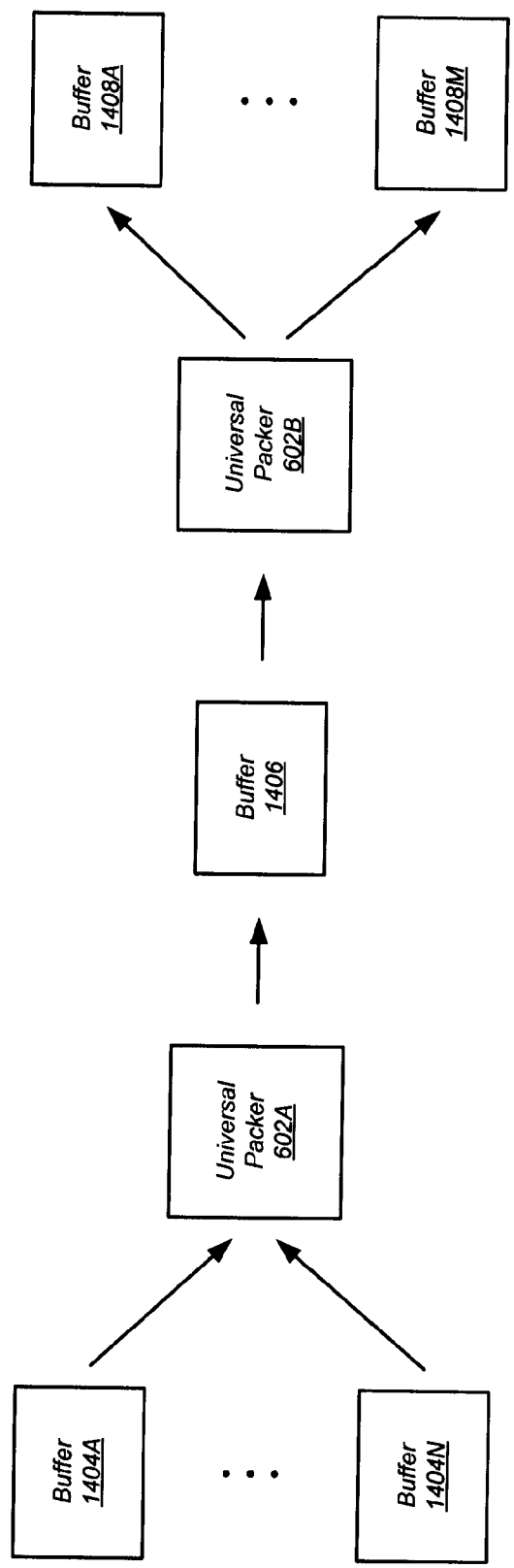
FIG. 14 shows an embodiment where two universal packers are used with a temporary buffer.

One advantage of the disclosed universal packers 602 is that they can be used as both packers and unpackers, so that only one design is required for both packing and unpacking. FIG. 14 illustrates this advantage, where two universal packers are used with a temporary buffer according to one embodiment. Referring to FIG. 14, one universal packer 602A packs data from buffers 1404A-N into a temporary buffer 1406, and another universal packer 602B unpacks the data into buffers 1408A-M from a temporary buffer 1406.

Figure 15:
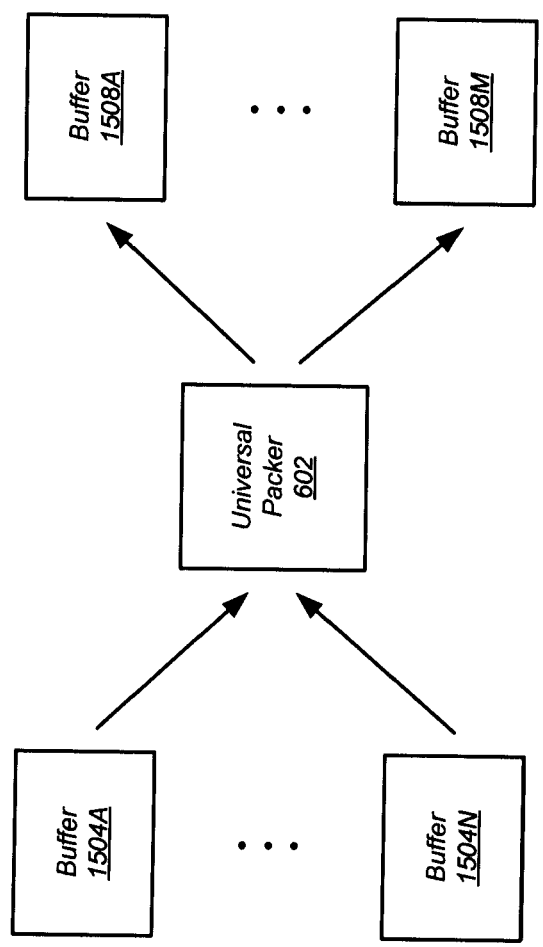
FIG. 15 shows an embodiment where one universal packer is used without a temporary buffer.

Another advantage of the disclosed universal packers 602 is that they can be used without a temporary buffer, thereby reducing the number of buffers and universal packers 602 require while increasing the speed of the data transfer. FIG. 15 illustrates this advantage, where one universal packer is used without a temporary buffer according to one embodiment. Referring to FIG. 15, one universal packer 602 packs data from buffers 1504A-N and unpacks the data into buffers 1508A-M, without the use of a temporary buffer.

Various embodiments of the present disclosure can be implemented in digital electronic circuitry, or in computer hardware, firmware, software, or in combinations thereof. Embodiments of the present disclosure can be implemented in a computer program product tangibly embodied in a tangible computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:

1. A data packer comprising:
   a controller configured to (i) receive output information, wherein the output information specifies an output alignment of data received into the data packer separately from the output information, and (ii) output a shift signal based on the output information;
   a register configured to store data previously received into the data packer;
   a first multiplexer configured to receive each of (i) the data received into the data packer and (ii) the data previously received into the data packer and stored in the register, the first multiplexer further configured to select between and pass, based on a selection signal, one of
   the data received into the data packer, and
   the data stored in the register;
   a rotate shifter configured to (i) receive the shift signal, and (ii) rotate-shift, in accordance with the shift signal, the one of the data received into the data packer and the data stored in the register passed by the first multiplexer to output shifted data;
   a second multiplexer configured to receive each of (i) the shifted data and (ii) the data stored in the register, the second multiplexer further configured to select between and pass at least one of
   the shifted data output by the rotate shifter, and
   the data stored in the register.

2. The data packer of claim 1:
   wherein the register is configured to store shifted data output by the rotate shifter.

3. The data packer of claim 1, wherein:
   the data received into the data packer is N bytes long, wherein N is an integer greater than zero; and
   the register is N bytes wide.

4. An apparatus, comprising:
   one or more first buffers;
   one or more second buffers;
   a temporary buffer;

a first data packer according to claim 1, wherein the first data packer is configured to pack data from the one or more first buffers into the temporary buffer; and
a second data packer according to claim 1, wherein the second data packer is configured to unpack data from the temporary buffer into the one or more second buffers.

5. An apparatus, comprising:
one or more first buffers;
one or more second buffers; and
a data packer according to claim 1, wherein the data packer is configured to pack data from the one or more first buffers, and to unpack the data into the one or more second buffers.

6. An integrated circuit comprising the data packer of claim 1.

7. A data packer, comprising:
a controller configured to receive output information, wherein the output information specifies an output alignment;
a first multiplexer configured to pass one of
data received into the data packer, and
data stored in a register of the data packer;
a rotate shifter configured to rotate-shift, in accordance with the output alignment, data passed by the first multiplexer;
a second multiplexer configured to pass at least one of
the data output by the rotate shifter, and
the data stored in the register, wherein:
the output information specifies a desired output length; and
the first multiplexer is further configured to pass data in accordance with the desired output length.

8. An apparatus, comprising:
a data packer, including:
a controller configured to receive output information, wherein the output information specifies an output alignment;
a first multiplexer configured to pass one of
data received into the data packer, and
data stored in a register of the data packer;
a rotate shifter configured to rotate-shift, in accordance with the output alignment, data passed by the first multiplexer; and
a second multiplexer configured to pass at least one of
the data output by the rotate shifter, and
the data stored in the register;
one or more first buffers configured to provide the data received into the data packer; and
one or more second buffers configured to receive data passed by the second multiplexer.

9. The apparatus of claim 8, further comprising:
one or more memory controllers configured to provide the output information.

10. A method for operating a data packer, the method comprising:
receiving data into the data packer;
receiving, separately from the data received into the data packer, output information, wherein the output information specifies an output alignment of the data received into the data packer;
outputting a shift signal based on the output information;
storing data previously received into the data packer;
selecting between and passing, based on the shift signal, one of
the data received into the data packer, and
the stored data previously received into the data packer;
rotate-shifting, in accordance with the shift signal, the one of the data received into the data packer and the stored data previously received into the data packer to output shifted data;
selecting between and passing at least one of
the shifted data, and
the stored data previously received into the data packer.

11. The method of claim 10, further comprising:
storing the shifted data.

12. The method of claim 11, further comprising:
packing data from one or more first buffers; and
unpacking the data into one or more second buffers.

13. The method of claim 11, wherein:
the output information specifies a desired output length; and
selecting between the data received into the data packer and the stored data previously received into the data packer comprises selecting in accordance with the desired output length.

14. The method of claim 11, further comprising:
packing data from one or more first buffers into a temporary buffer; and
unpacking data from the temporary buffer into one or more second buffers.

15. Tangible, non-transitory, computer-readable media embodying instructions executable by a data packer to perform functions, comprising:
receiving data into the data packer;
receiving, separately from the data received into the data packer, output information, wherein the output information specifies an output alignment of the data received into the data packer;
outputting a shift signal based on the output information;
storing data previously received into the data packer;
selecting between and passing, based on the shift signal, one of
the data received into the data packer, and
the stored data previously received into the data packer;
rotate-shifting, in accordance with the shift signal, the one of the data received into the data packer and the stored data previously received into the data packer to output shifted data;
selecting between and passing at least one of
the shifted data, and
the stored data previously received into the data packer.

16. The tangible, non-transitory, computer-readable media of claim 15, wherein the functions further comprise:
storing the shifted data.

17. Tangible, non-transitory, computer-readable media embodying instructions executable by the data packer of claim 16 to perform functions, further comprising:
packing data from one or more first buffers; and
unpacking the data into one or more second buffers.

18. The tangible, non-transitory, computer-readable media of claim 16, wherein:
the output information specifies a desired output length; and
selecting between the data received into the data packer and the stored data previously received into the data packer comprises selecting in accordance with the desired output length.

19. Tangible, non-transitory, computer-readable media embodying instructions executable by the data packer of claim 16 to perform functions, further comprising:
packing data from one or more first buffers into a temporary buffer; and unpacking data from the temporary buffer into one or more second buffers in accordance with claim 16.

\* \* \* \* \*